H. RICHMANN.
Dental-Pluggers.
No. 213,134. Patented Mar. 11, 1879.
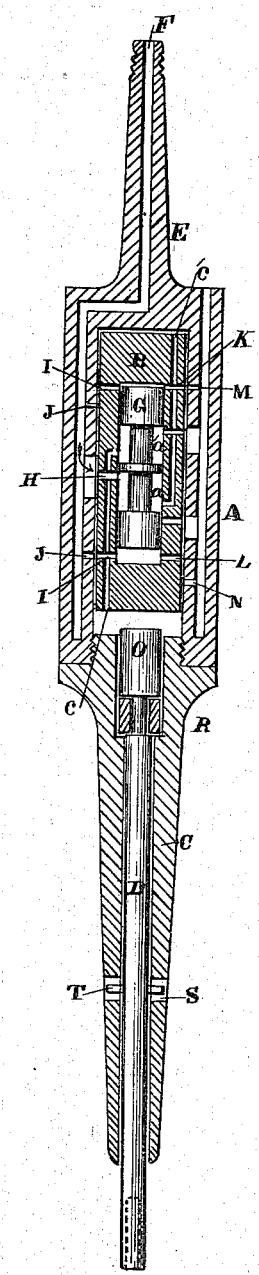
Witnesses
Geo. H. Strong
Frank A. Brook
Inventor
Henry Richmann

UNITED STATES PATENT OFFICE.

HENRY RICHMANN, OF SAN FRANCISCO, CALIFORNIA.

IMPROVEMENT IN DENTAL PLUGGERS.

Specification forming part of Letters Patent No. 213,134, dated March 11, 1879; application filed November 7, 1878.

*To all whom it may concern:*

Be it known that I, HENRY RICHMANN, of the city and county of San Francisco, and State of California, have invented a Dental Engine and Mallet; and I hereby declare the following to be a full, clear, and exact description thereof, reference being had to the accompanying drawings.

My invention relates to certain improvements in that class of mechanism which is intended to give a reciprocating motion to dental tools, said mechanism being known as a "dental engine;" and it consists in a piston moving axially within the cylinder, and containing a valve which is concentric with itself, and has a reciprocating movement in the same direction with the piston, suitable ports being formed within the cylinder and piston to afford ingress and egress to the air employed as a motor, in combination with a stem or spindle which holds the tool and is actuated by the movement of the piston, said spindle moving in a case which is slotted transversely to receive a pin which limits the stroke of the piston and tool.

Referring to the accompanying drawings for a more complete explanation of my invention, Figure 1 is a view of my device. Fig. 2 is a longitudinal section.

A is an outer case or cylinder, within which the piston B reciprocates, and C is an extension screwed to the case A, and within which the spindle or stem D moves.

The case or cylinder A has an extension or tube, E, at one end, which is hollow and is fitted to receive a flexible air-conveying pipe.

A passage, F, connects with the hollow extension, and passes along one side of the cylinder, so as to connect with the supply-ports, as will be hereinafter described.

Upon the opposite side of the cylinder are the exhaust-ports, which are suitably placed to discharge the air. The piston B fits into the cylinder, and is made hollow in the direction of its length. Within this hollow piston is placed a valve, G. This valve has a head at each end and a central flange which fits closely, while between these points are portions which are turned smaller, as shown. The port H, which opens through the side of the piston near its center, allows the air to enter it and surround the valve. When the valve is at one end of its stroke this port will communicate with the space $a$, and when it is at the opposite end of the stroke it will communicate with the space $a'$. Two passages, $c\ c'$, are made within the body of the piston, one extending out at one end and opening into the space $a$, which surrounds the valve, while the other connects the space $a'$ with the opposite end of the piston-chamber.

It will be evident that when the valve is in the position which allows the passage H to communicate with the space $a$, the air will rush through the passage $c$ and into the cylinder behind the piston, so as to drive the piston to the opposite end of the cylinder.

During this movement a port, I, which opens through the side of the piston and into the valve-chamber behind the valve, is opened by being brought opposite a supply-port, J, in the cylinder. This allows the air to rush in and drive the valve to the end of its chamber, moving in the same direction with the piston.

The exhaust-passages K and L at each end connect, respectively, with the ends of the valve-chamber and the cylinder, and open through ports M and N, so that when the piston and valve start upon their return stroke the air at the opposite ends of each will be allowed to escape.

The air for the return stroke is admitted to the space $a$ and passage $c$ from the port H by the movement of the valve which carries the central flange past the port.

By this construction I provide an extremely effective motor. The piston and valve moving in the same direction do not retard the action of each other, and I am enabled to obtain a very high rate of speed.

This piston acts as a mallet and strikes the head O of the independent stem or tool-holder D, which is situated within the lower part or guide C of the tool. This head is enlarged, and a chamber just below it receives a spring, R, which serves to return the stem after each stroke.

The spring R is made of rubber or other elastic material, and fits around the reduced portion of the stem beneath the head, so as to not only return the stem after the stroke, but also to serve as a packing to prevent the escape of air from the cylinder. This feature renders the action much more effective, and the speed can be considerably increased on account of non-leakage.

A slot, S, is made through the guide C, and a pin, T, passing transversely through the stem, extends out into this slot, so that it only allows the stem to move the length of this slot. This prevents the piston from being bruised by striking the ends of the cylinder, and avoids the necessity of special cushioning devices.

I have adopted this principle of direct-acting piston and contained valve to a rock-drilling apparatus, which is made the subject of another application for Letters Patent.

I am aware that dental tools have been constructed having a piston which reciprocates longitudinally within a cylinder and a valve which moves transversely within the said piston; but this is objectionable on account of the number of parts, difficulty of construction, and the constant striking of the ends of the valve against the sides of the cylinder. I do not claim, broadly, a piston containing its controlling-valve; but What I do claim as new, and desire to secure by Letters Patent, is—

1. In a dental engine, the hollow piston or mallet B, moving within the cylinder A, and containing the valve G, moving in the same direction with the piston, in combination with the stem D, with its head O, and the spring R, substantially as herein described.

2. In a dental engine, the piston or mallet B, moving within the cylinder A, so as to give successive blows upon the head of the stem P, in combination with the elastic spring and air-tight packing R, to return the stem after a stroke and prevent leakage from the cylinder, substantially as herein described.

3. In a dental engine, the hollow piston or mallet B, moving longitudinally within the case A, and provided with the longitudinally-moving valve G, as shown, in combination with the stem D, with its transverse pin T, and the slotted guide C, substantially as and for the purpose herein described.

In witness whereof I have hereunto set my hand.

HENRY RICHMANN.

Witnesses:
GEO. H. STRONG,
FRANK H. BROOKS.